INVENTOR.
HELLMUT I. GLASER
BY
ATTORNEYS

INVENTOR.
HELLMUT I. GLASER
BY
ATTORNEYS

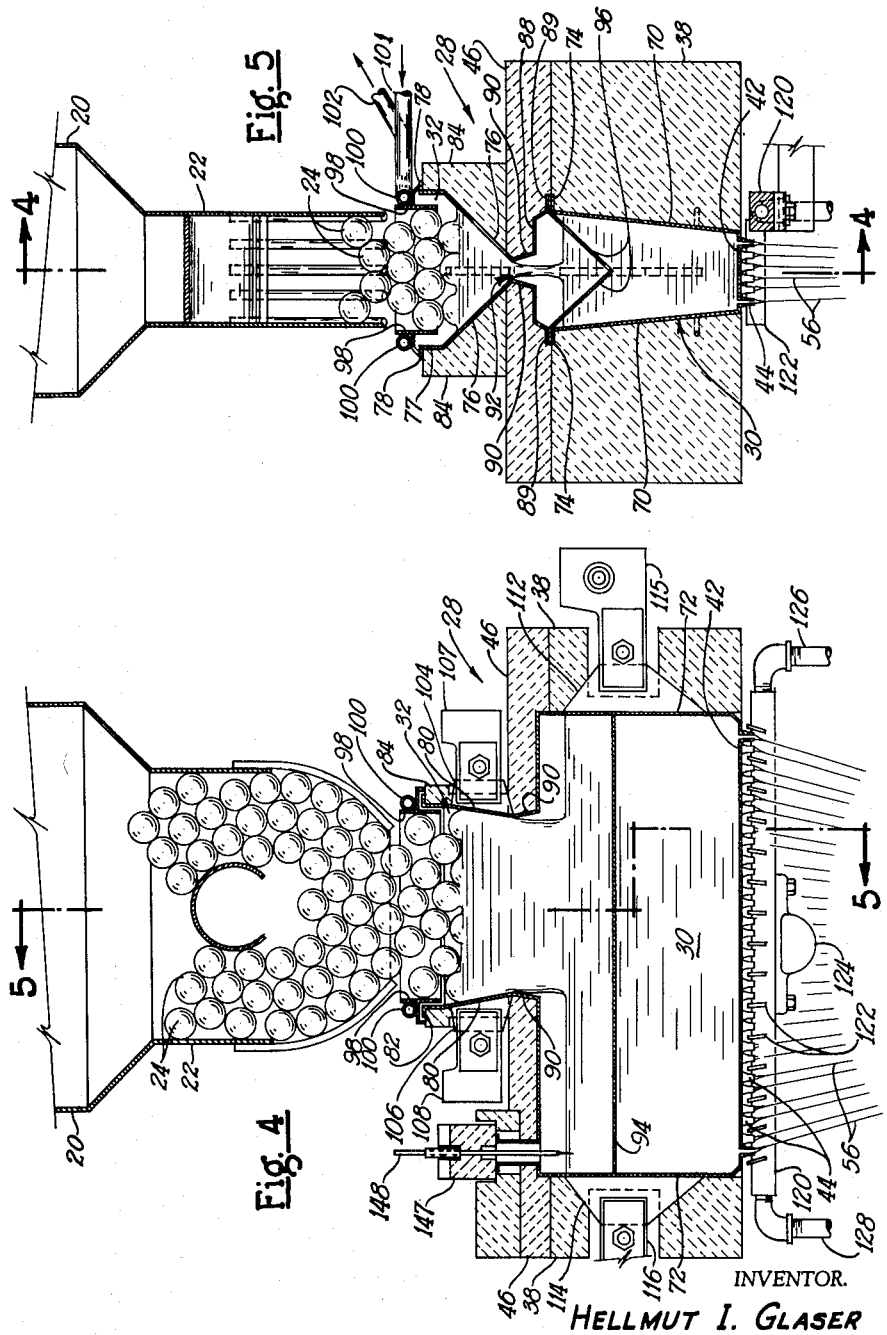

INVENTOR.
HELLMUT I. GLASER

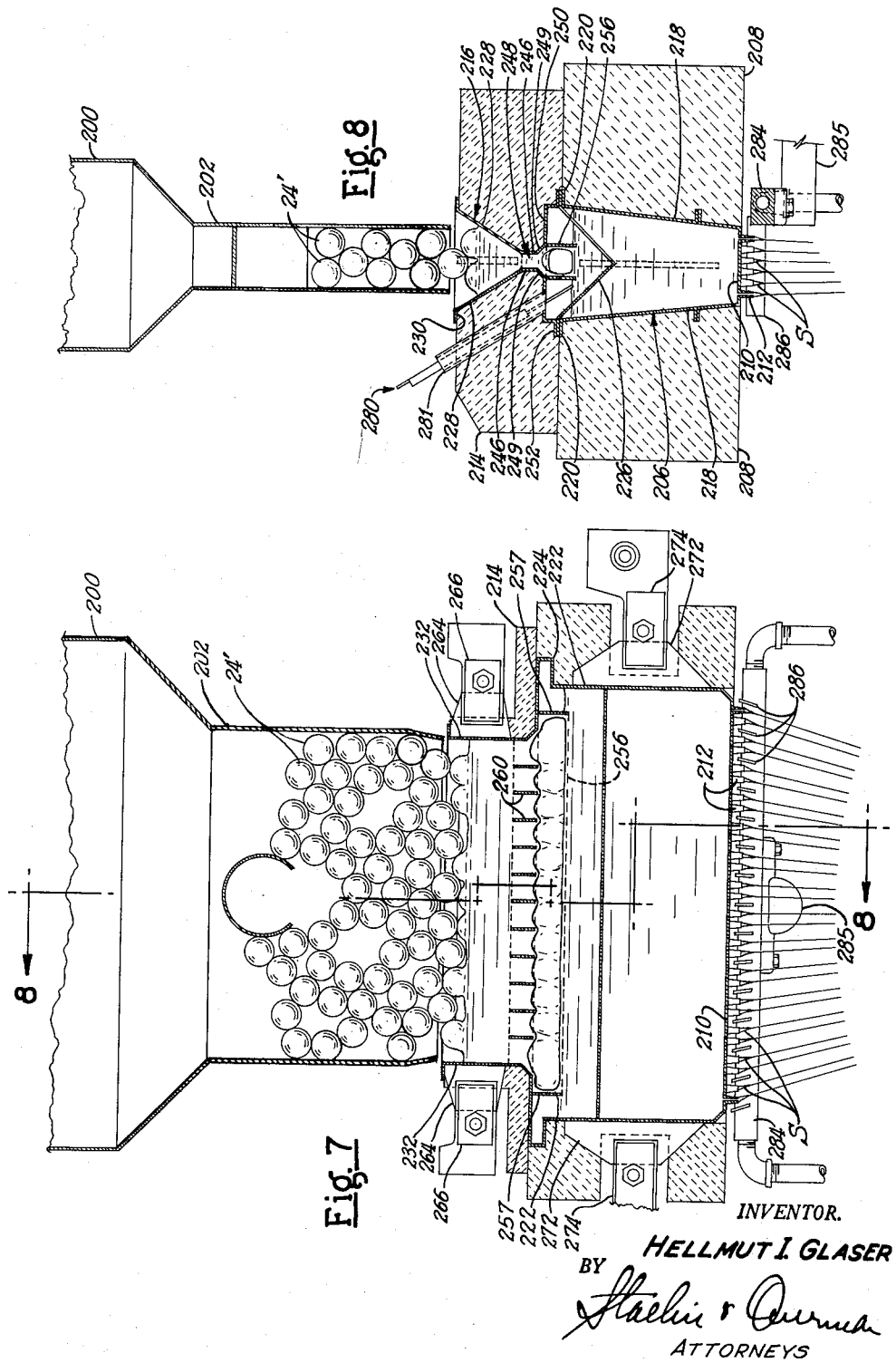

United States Patent Office 3,028,442
Patented Apr. 3, 1962

3,028,442
METHOD AND APPARATUS FOR MELTING AND FEEDING HEAT-SOFTENABLE MATERIALS
Hellmut I. Glaser, Anderson, S.C., assignor to Owens-Corning Fiberglas Corporation, a corporation of Delaware
Filed Oct. 1, 1959, Ser. No. 843,660
9 Claims. (Cl. 13—6)

This invention relates to a method of and apparatus for melting heat-softenable material and for delivering or discharging streams of the material and more particularly to an arrangement for heating and melting heat-softenable mineral materials such as glass and flowing streams of the molten material from a feeder and the streams attenuated to linear bodies, filaments or fibers particularly usable in the fabrication of strands, threads or yarns for textile purposes.

In the manufacture of textiles formed of strands, yarns or threads of glass fibers or filaments, the fibers or filaments must be of substantially uniform size and character in order that commercially acceptable textiles may be produced. The glass or mineral material employed in forming filaments for textile uses must be highly refined and of homogeneous character.

To attain high quality glass usable for this purpose, the glass batch is usually melted, fined and refined in a comparatively large furnace containing many tons of glass until the glass is free of seeds, cords, stria and impurities which would impair the quality of the glass. The refined glass from such furnace is fashioned or molded into pieces or cullet preferably in the shape of small spheres or marbles which are adapted to be resoftened for forming textile filaments.

One process of resoftening the marbles involves the delivery of marbles individually and periodically by mechanical gating means through a chute into the electrically heated feeder. The molten glass in the feeder is at a temperature of upwards of 2300° F. or more while the marbles introduced into the feeder are at room temperature.

A deviation of a few degrees in the temperature of the glass in the feeder changes its viscosity and results in variations in the size or character of the filaments formed from the streams. As each relatively cold marble or piece of glass is delivered into a feeder, it causes an immediate temperature and viscosity change or thermal shock in the molten glass in the feeder.

Thermal shock is accentuated where a large number of streams are flowed continuously from a feeder necessitating successive delivery of individual marbles at short intervals, a condition which causes a continuous fluctuation in the viscosity of the molten glass in the feeder and the streams and renders control difficult.

Another process involves the continuous resoftening or reduction of marbles or cullet to a molten state in a premelter arranged independently of and spaced from the feeder and wherein comparatively large streams of the resoftened glass are flowed from the premelter through the atmosphere into the feeder and the glass heat conditioned in the independent feeder prior to flowing a plurality of streams from the feeder for attenuation to fibers or filaments. Such process effects a reduction of thermal shock in the feeder as heated glass is delivered into the feeder but exposure of the heated glass to atmosphere in its movement from the premelter into the feeder accentuates gasification and formation of excessive volatiles which must be liberated from the glass in the feeder and to a certain extent impairs the control of properly coordinating the rate of melting the glass with the rate of discharge of streams from the independent feeder.

The present invention relates to an improvement on the latter mentioned process and embraces a method of reducing heat-softenable mineral material to a flowable state and delivering the flowable material into a feeder through a restricted confined zone into a feeder whereby control of the softening or melting rate may be accurately coordinated with the flow rate from a confined feeder zone and material delivered to the feeder without thermal shock.

Another object of the invention resides in establishing a melting region and feeder connected by a restricted walled passage wherein the material in solidified form is delivered into the melting region and reduced to a molten condition by controlled heat applied to the melting region and the molten material in the feeder zone maintained in desired condition by controlled heat effective in the feeder.

Another object of the invention is the provision of an apparatus embodying two chambers joined together by a walled passage of restricted area, one of the chambers being adapted to receive solid pieces of heat-softenable material and heat applied thereto to reduce the solid pieces to a molten state and delivering the molten material to the other chamber under confined conditions whereby the formation of volatiles in the molten material is substantially reduced.

A further object of the invention is the provision of a combined melter and feeder for heat-softenable material, such as glass, wherein a melting chamber is integrated with a feeder chamber by a restricted walled throat, the arrangement including flowing electric energy through controlled means to both chambers to generate heat whereby the heat applied in the chambers may be regulated to vary the melting rate of material in the melting chamber and maintain a desired viscosity of the material in the feeder chamber.

Still a further object of the invention resides in a method of and apparatus for melting and conditioning heat-softenable mineral material, such as glass, in an integrated unit of combined melter and feeder wherein the melter and feeder zones are connected by a restricted walled passage through which molten material flows from the melter into the feeder, and flowing electric energy through controlled means to the melter and feeder individually to generate heat in both melter and feeder zones whereby the heating rates may be varied but with substantially no differential in temperature between the molten material in the restricted passage and the material in the feeder and thereby avoiding thermal shock in the feeder.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 4 is a vertical sectional view taken substantially on the line 4—4 of FIGURE 3;

FIGURE 5 is a vertical sectional view taken substantially on the line 5—5 of FIGURE 4;

FIGURE 7 is a longitudinal vertical sectional view of a modified form of melter and feeder arrangement of the invention, and FIGURE 8 is a transverse sectional view taken substantially on the line 8—8 of FIGURE 7.

While the method and apparatus of the invention have particular utility in processing and conditioning glass for forming textile filaments, it is to be understood that the method and apparatus of the invention may be utilized for conditioning and processing other materials for various purposes.

Figure 1:
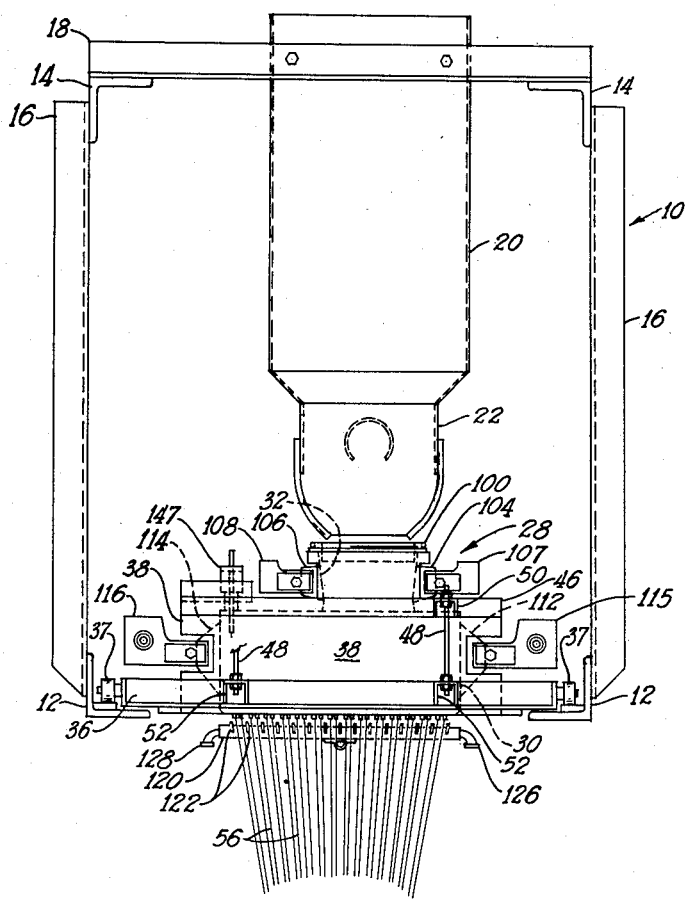
FIGURE 1 is a front elevational view of an apparatus embodying the invention especially usable for conditioning heat-softenable material from which filaments or fibers may be formed by attenuation.
Figure 3:
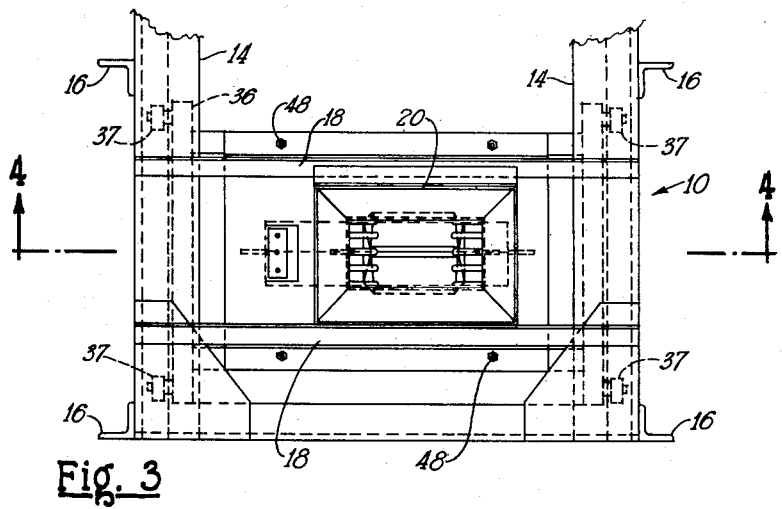
FIGURE 3 is a top plan view of the arrangement shown in FIGURES 1 and 2.
Figure 2:
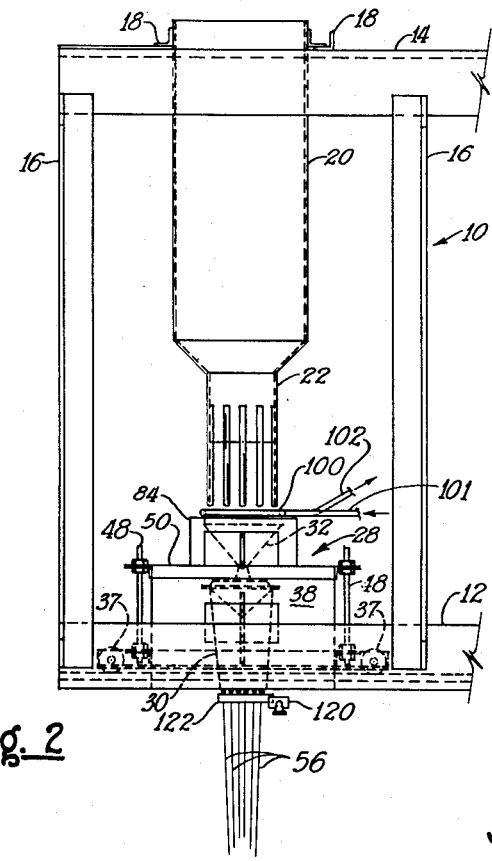
FIGURE 2 is a side elevational view of a portion of the arrangement shown in FIGURE 1.

Referring to the drawings in detail, and initially to FIGURES 1, 2 and 3, a form of the apparatus of the invention is illustrated which is especially adaptable for the formation of fine continuous filaments of glass for fabricating textile strands, threads and yarns. The apparatus is supported upon a frame 10 comprising pairs of vertically spaced horizontally arranged beams 12 and 14 joined by vertical struts 16, the upper members 14 being connected by horizontally arranged beams 18.

The beams 18 of the frame 10 support a hopper 20 having a material delivery portion 22 of reduced size, the hopper adapted to contain a supply of material to be heat-softened or rendered molten and from which fibers or filaments are to be formed.

As illustrated, the material such as glass in the hopper 20 is preferably in the form of cullet or marbles 24 for delivery into a melting zone as hereinafter described.

The frame 10 supports a combined or integrated melter and feeder unit 28. The unit 28 includes a feeder or bushing compartment or chamber 30 and a melter chamber 32 which are connected together in a manner hereinafter described. Supported by the lower beams 12 of the frame 10 is a supplemental frame or structure 36 of rectangular shape and provided with rollers 37 engaging the beams 12 to facilitate movement of the frame 36. Mounted upon the supplemental frame 36 is a pair of longitudinally extending blocks or members 38 arranged at the sides of the feeder compartment or chamber 30, the blocks being contoured to embrace or surround the feeder 30. The blocks 38 are formed of high temperature refractory. The bottom of wall 42 of the feeder chamber 30 is formed with a plurality of rows of tips or projections 44, each being formed with an orifice or opening through which the molten or heat-softened glass in the feeder chamber 30 is discharged to provide a plurality of streams from which the filaments or fibers are formed.

A plate or cover 46 is supported by blocks 38 as particularly shown in FIGURES 1, 2, 4 and 5. The blocks 38 are supported upon the supplemental frame 36 and are secured to the supplemental frame 36 by tie bolts 48, their upper ends being secured to transverse bars 50 arranged above the cover plate 46, the lower ends of the tie bolts engaging in clips 52 forming a part of the supplemental frame 36.

The streams, flowing through the orifices in the tips or projections 44, may be processed into fibers or continuous filaments by attenuation. As shown in FIGURE 1, one use of the melter and feeder unit is to provide glass streams from which fine continuous filaments may be formed by mechanical attenuation. The continuous filaments 56 formed from the glass streams are converged into a sliver or strand 58 by means of a gathering device or member 60 and the strand 58 collected by winding the same upon a rotatable sleeve or collector 62 to form a strand package.

The sleeve is supported upon a rotatable collet or arbor 64 driven by a motor or other suitable means (not shown) contained within a housing 65. The streams are attenuated to filaments by winding the strand upon the rotating sleeve 62. Any number of orificed projections 44 may be provided on the bottom wall of the feeder dependent upon the number of filaments desired in the strand 58. The number of filaments in a strand may be upwards of four-hundred or more.

A traverse means 66 may be utilized to distribute the strand lengthwise of the collector sleeve 62 whereby the package is built up of superposed layers of the strand. A lubricant or coating material may be applied to the filaments and as shown in FIGURE 1 a tube or pipe 68 may be disposed adjacent the gathering device 60 arranged to deliver lubricant or other coating material to the gathering device 60 and the coating transferred to the filaments by the wiping action of the filaments.

Figure 6:
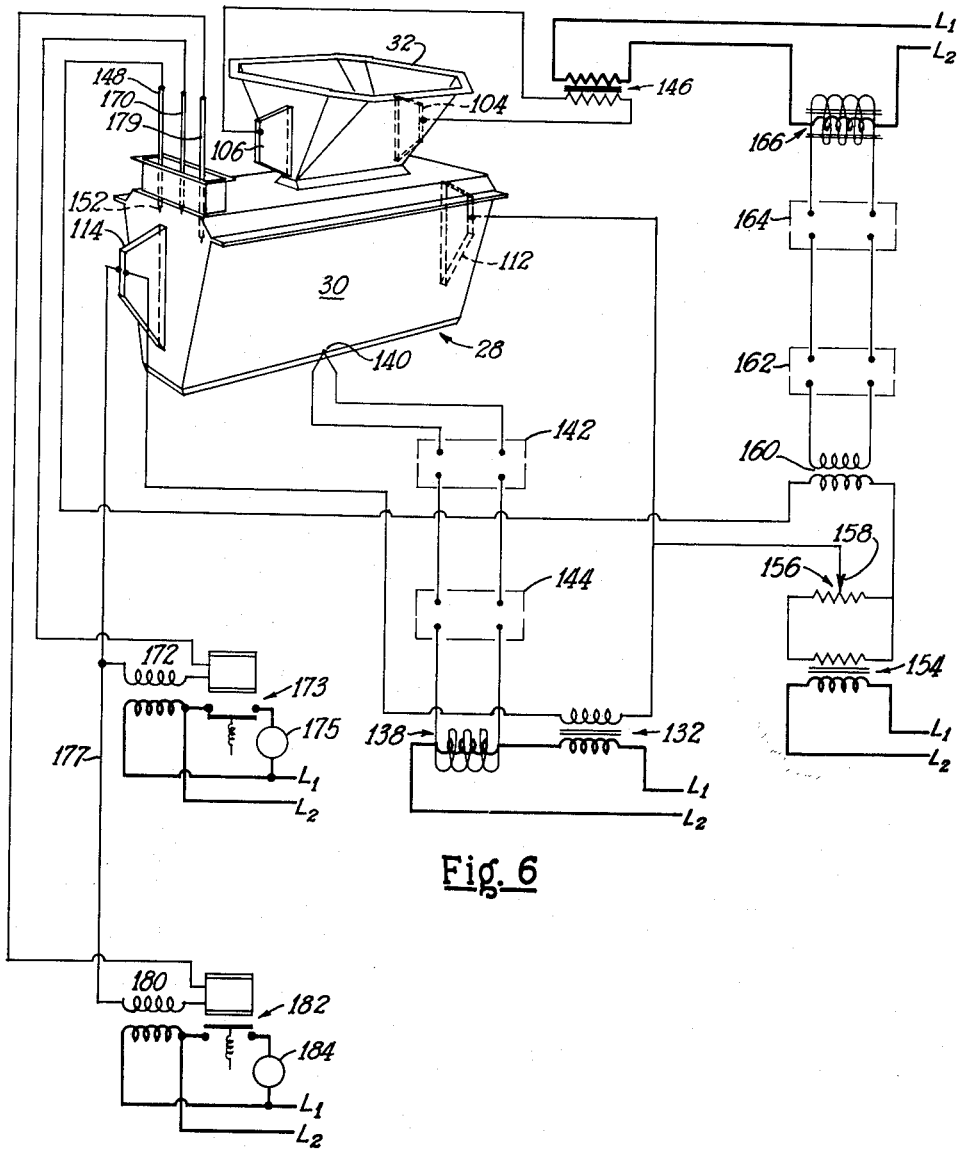
FIGURE 6 is a schematic view illustrating the combined melting and feeder unit and circuits controlling the heating and conditioning of the material in the unit.

The combined melter and feeder unit 28 is particularly illustrated in further detail in FIGURES 4, 5 and 6. One of the important features of the arrangement of the invention resides in connecting the feeder and melter compartments together. The feeder chamber or zone 30 is of rectangular configuration provided by side walls 70 joined with end walls 72, both side and end walls being joined with the bottom wall or floor 42. The walls and other metal components of the feeder 30 and the melter 32 are formed of platinum rhodium or other material capable of withstanding the high temperatures of the molten glass or other material.

As shown in FIGURE 5, the side walls 70 are slightly divergent in an upward direction, the upper ends of the side walls being formed with laterally extending flanges 74 to which the melter compartment is secured. The melter compartment 32 is formed with side wall portions 76 which are in converging relation as shown in FIGURE 5 and which form continuations of vertically arranged side wall portions 77. The upper extremities of side wall portions 77 are formed with upwardly and laterally extending flanges 78.

The melter compartment or chamber 32 is formed with end walls 80 which are slightly convergent in a downward direction as shown in FIGURE 4, the upper ends of the end walls 80 being formed with laterally extending flanges 82. Disposed at each side of the melter 32 are blocks or members 84 of refractory material shaped to embrace or surround the chamber 32 providing a heat insulating means to minimize heat losses from the melter chamber 32 and provide a support for the melting unit through the engagement of the flanges 78 and 82 with the upper surfaces of the blocks 84.

Disposed above the feeder compartment or chamber 30 is a metal cover portion 88 formed with flanges 89 which mate with the flanges 74 and are welded thereto forming a sealed joint. The downwardly extending side wall portions 76 and end walls 80 forming the melter chamber 32 are formed with connecting portions or walls 90 which are joined by welding to the member 88 providing a restricted throat or walled passage 92 connecting the melter compartment 32 with the feeder compartment 30 whereby molten or heat-softened glass or other fiber-forming material in the melter unit 32 may flow into the upper region of the feeder compartment or chamber 30 without contact with the atmosphere.

The width of the throat or passage 92 is preferably substantially less than the diameters or sizes of the cullet or marbles 24 delivered from the hopper 22 into the melter 32 to prevent their passage into the feeder and to reduce cross flow of electric energy between the melting chamber and feeder.

A screen 94, preferably of V-shaped configuration formed by converging perforated walls 96, is disposed within the feeder and extends lengthwise thereof. The perforations or openings in the walls 96 forming the screen are comparatively small so as to prevent the passage of cords or incompletely melted glass that may enter the feeder chamber through the passage 92.

The upper region of the melter compartment 32 is preferably provided with a liner or baffle 98 of rectangular shape having its walls spaced inwardly from the upper portions of the sides and end walls of the melter 32. The rectangularly shaped liner 98 is formed of platinum rhodium or other material having high temperature resistant characteristics.

Surrounding the liner or baffle 98 is a conduit or tube 100 provided with an inlet 101 and an outlet 102. The tube or pipe 100 is adapted to accommodate circulating cooling fluid such as water, oil or air to maintain the liner or baffle 98 below the softening temperature of the glass cullet or marbles 24. Through the provision of the cooled liner 98, devitrification is avoided at the side and end regions of the melter 32 as the marbles of glass at the entrance region of the melter are maintained out of contact with the upper regions of the walls of the melter.

The softening or reduction of the pieces of material or marbles to a flowable or molten condition is carried on in the melting chamber 32 by heat generated by flow of electric current through the walls of the chamber 32. Welded or otherwise secured to the end walls 80 of the melting chamber are lugs or connector terminals 104 and 106 which respectively accommodate terminal clamps 107 and 108. The terminal clamps 107 and 108 are supplied with current by circuit means from a power transformer as hereinafter described. The resistance to current flow through the walls of the melting chamber 32 provides heat for softening or melting the marbles or pieces of material 24 in the melting chamber.

The glass or molten material in the feeder chamber 30 is maintained at the proper temperature and viscosity by the application of heat. Heat is applied by flowing electric current through the feeder 30 and the material contained therein by circuit means substantially independent of the circuit supplying current to the melter 32.

Welded or otherwise secured to the end walls 72 of the feeder chamber 30 are lugs or terminals 112 and 114, the terminals 112 and 114 respectively accommodating connectors or clamps 115 and 116 which are supplied with current through a circuit means shown in FIGURE 6 and hereinafter described.

The current supplied to the feeder 30 passes through the walls of the feeder and through the screen 94 whereby the heat generated by resistance to current flow is substantially uniformly distributed throughout the material in the feeder. By this method the material in the feeder is maintained at a substantially constant viscosity so that uniform streams and filaments of uniform size may be formed from the molten material discharged through the orifice tips 44. As mentioned herein, the formation of filaments of uniform size is dependent upon the maintenance of desired viscosity characteristics of the glass throughout the feeder.

It has been found advantageous to slightly increase the viscosity of the streams by reducing the temperature at a region just beneath the feeder chamber 30 to assure satisfactory attenuation of the streams. A tubular member or manifold 120 is disposed beneath and substantially parallel with the bottom wall or floor 42 of the feeder and is provided with a plurality of transversely extending thin metal fins 122, a fin extending between each two rows of transversely aligned orificed projections 44 as shown in FIGURE 4. The member 120 is mounted upon a suitable support 124.

The ends of the manifold 120 are respectively connected with inlet and outlet pipes 126 and 128. A cooling fluid, such as water, is continuously circulated through the manifold 120 and some of the heat from the streams of glass is conducted by the fins 122 to the manifold 120 and transferred to the circulating fluid in the manifold. Through this arrangement, the viscosity of the streams of glass may be controlled or increased.

The circuit arrangements and components for controlling the current supplied to the melter chamber 32 and the feeder chamber or bushing 30 and a means for maintaining a substantially constant level or head of glass or molten material in the feeder are illustrated schematically in FIGURE 6. The current supply to the feeder or bushing 30 is derived through the transformer 132 from a power source or supply line designated L1 and L2. The power source, for example, may be a 440 volt, 60 cycle alternating current.

The transformer 132 reduces the voltage in the secondary circuit to a value of about two volts, the secondary providing heating current of one or more kiloamperes. The primary of the transformer 132 is in circuit with a saturable core reactor 138 which functions as a variable impedance for adjusting current flow through the feeder chamber 30 to secure the desired temperature therein. The saturable core reactor 138 is associated with a thermocouple 140 which may be secured to a wall of the feeder and functions to monitor an electric signal corresponding to the feeder temperature.

The thermocouple circuit includes an amplifier 142 which amplifies the temperature signal to a regulator 144, the latter supplying direct current to the saturable core reactor 138 which modifies the impedance in the primary of the transformer 132 to automatically maintain a fixed feeder temperature. The regulator 144 is adjustable to vary the temperature of the feeder. For example, a rise in temperature of the feeder causes direct current supplied from the regulator 144 to the reactor 138 to be reduced thereby increasing the impedance and diminishing the current flow in the secondary circuit to the feeder.

If the temperature of the feeder decreases, the regulator 144 increases the direct current to the reactor 138, reducing the impedance and increasing the current flow in the secondary circuit to increase the heating of the feeder. Through this method of control, the temperature, and hence viscosity of the material in the feeder, is maintained substantially constant regardless of variations in the rate of flow of the material through the orifices in the tips 44 of the floor of the feeder.

The supply of molten material in the feeder is replenished from molten material in the melter chamber 32, the molten material flowing into the feeder through the confined zone provided by the restricted passage or throat 92 shown in FIGURE 5. The heating current for the melter 32 is supplied through a transformer 146 connected with a power line or source designated L1, L2. The rate of delivery of marbles, cullet or pieces of mineral material 24 into the melter 30 from the hopper 22 is dependent upon the rate of melting or reduction of the marbles to a molten state in the melter 32.

The rate of melting of the marbles is dependent upon the amount of heat and hence the amount of current flow through the melter 30. The arrangement illustrated includes automatic controls whereby the rate of flow of molten glass or material from the melter 32 into the feeder 30 is synchronized or coordinated with the rate of delivery of the glass of the streams flowing through the orificed tips 44 of the feeder.

This control is maintained by the continuous regulation through a glass level control circuit which monitors the current flow to the melting chamber 32 and hence the melting rate of the marbles or pieces of material in the melter 32. The control circuit includes a probe bar or member 148 which is insulatingly supported by a member 147 of refractory or other high temperature resistant material, the probe 148 being vertically adjustable. The probe bar 148 has a tapered extremity 152 normally in contact with the surface of the glass or molten material in the feeder 30.

A difference in potential is established between the probe bar 148 and the molten glass by circuit connections with a transformer 154 through a voltage divider 156. The transformer 154 is supplied with current from a line L1, L2 and provides a secondary circuit of comparatively low voltage to the voltage divider 156. The adjustable member 158 of the voltage divider provides for the selection of voltage across the feeder and molten glass therein through the terminal 112 and the probe member 148. A coupling transformer 160 in circuit with the probe 148 impresses a current signal from the probe circuit to an amplifier 162 and the amplifier current signal fed to a regulator 164.

The regulator 164 is in circuit with a second saturable core actuator 166 in the primary circuit of transformer 146 which supplies current to the melting chamber 32. The amplifiers 142 and 162 and the regulators 144 and 164 are of conventional construction. The amplifier 162 and regulator 164 function to transfer an amplified probe current signal which constantly monitors or regulates the flow of current to the melting chamber 32 thereby controlling the melting rate of material in the melter 32 and hence the rate of replenishment of molten glass in the feeder 30 as the molten glass is discharged through the orifices in the bottom wall or floor of the feeder.

It has been found that variations in the depth of the probe from a point at which contact is completed with the surface of the molten glass in the feeder to a slight depth can be utilized to effect variation in contact resistance and current in the probe circuit corresponding to a range of glass levels in the feeder 30 whereby the current in the probe circuit may be employed to regulate the level of the glass in the feeder and a desired glass level preselected by adjustment of the regulator 164.

The tapered extremity 152 of the probe provides for substantial variations in the area of contact with the glass upon minute variations in the level of the glass which provides a correspondingly greater variation in resistance or extent of contact with the molten glass.

The saturable core reactor 166 controls the amount of current supplied to the melter 32 so that variations in the level of the molten glass in the feeder 30, through the probe circuit, influences the reactor 166 so that more or less current may be supplied to the melter 32 to increase or decrease the rate of melting of the marbles and hence the rate of flow of molten glass from the melter 32 into the feeder 30.

In the operation of the probe glass level control arrangement, the probe 148 is mounted with the tapered portion 152 extending about one-thirty-second of an inch below the surface of the molten glass in the feeder when the glass is at the level to be maintained. Variations in current value, due to variations in the level of the glass, are effective through the regulator 164 and the reactor 166 to modify current flow to the melting chamber 32.

If the level of the glass in the feeder rises, current flow in the probe circuit increases, which current flow is effective through the amplifier 162, regulator 164 and reactor 166 to increase the impedance in the circuit of the melting chamber 32. This causes a reduction in current flow to the melter 32 and hence reduces the heat applied in the melter. This effects a reduction in the melting rate and an increase in the viscosity of the molten glass in the melter and consequently reduces the flow rate of molten glass into the feeder until the level of the glass in the feeder is lowered to the desired standard level.

Should the level of the glass in the feeder 30 fall below the desired level, the resistance in the probe circuit is decreased, which through the amplifier 162, regulator 164 and reactor 166 increases current flow to the melter 32 to thereby apply more heat in the melter, increasing the melting rate and decreasing the viscosity of the molten glass to increase the flow of glass into the feeder to bring the glass level up to the desired standard. The desired level of glass in the feeder is automatically maintained so that a substantially constant head of molten glass is contained within the feeder.

Through the arrangement above described, the marbles of glass maintained in a bulk supply above the melter are automatically advanced by gravity into the melter 32 in proportion to the rate of melting carried on within the melter 32. The cooled liner or baffle 93 prevents the marbles or pieces of glass from contacting the upper regions of the walls of the melter and hence substantially reduces or eliminates any tendency for devitrification occurring at these wall regions of the melter.

Replenishment of molten glass in the feeder 30 is assured by the continuous flow or delivery of molten glass from the melter 32 through the restricted passage or throat 92, the glass level being maintained by control of the electric energy and hence the heat applied to the melter in the manner above described.

The arrangement of the invention obtains several advantages over prior melter and feeder arrangements. By forming the melter and the feeder as a unit construction without any open areas between the melter and feeder, the heat losses are reduced to a minimum, thus providing for a more efficient melting and feeding of the glass and facilitating more accurate control of the level of the glass in the feeder.

The arrangement provides for the substantial exclusion of air from the feeder and the region of the melter containing molten glass, thus further reducing the liability of heat loss and a reduction of volatiles emanating from the molten glass. It is found that the application of current flow through the feeder concomitantly with the application of current flow through the melter from a separate electric circuit does not impair the rate of melting of the marbles or cullet in the melter but substantially eliminates a region of marked temperature differential at the metallic connection of the walled throat 92 with the melter and the feeder so that little or no temperature variation attends the flow or transfer of molten glass from the melter into the feeder.

This method of operation avoids thermal shock to the molten glass in the feeder and thus eliminates the use of special heat accelerating devices in the feeder. Apparently the reduced cross-sectional wall area provided by the walls 90 defining the throat or restricted passage 92 functions in the nature of a resistance barrier between the current flow through the melter and the current flow through the feeder so that there is inappreciable cross current flow between the feeder and melter even though they are mechanically and electrically connected.

The arrangement preferably includes signal means for indicating abnormal or excessive variations in the level of the glass in the feeder 30. As shown schematically in FIGURE 6, a signal probe rod or bar 170 carried by the insulating member 147 extends into the feeder, the lower end being arranged above the normal level of the glass in the feeder so that it is normally out of contact therewith. The probe or signal bar 170 is connected with a coil 172 of a normally open relay 173, the contacts of the relay being in circuit with a power source L1, L2 and a signal means 175.

The signal means may be visual, as for example an electrically energizable lamp, or may be audible, such as a buzzer, bell or the like. The circuit connection 177 through the relay coil 172 is connected with the circuit through the terminal lug 114. When the level of glass in the feeder 30 is below the probe signal bar 170, no current flows through the relay coil 172. When the glass level rises to establish contact with the bar 170, current flows through the glass, the bar 170 and relay coil 172 energizing the armature of relay 173 to close the contacts to complete the circuit through the signal means 175 indicating an abnormal rise in the glass level in the feeder 30.

Also mounted in the insulating member 147 is a second probe signal bar 179 connected with a coil 180 of a relay 182 which is held in open circuit position by current flow through the relay coil 180.

When the level of glass in the feeder 30 falls below the tip or extremity of the probe signal bar 179, current flow through the coil 180 is interrupted and the contact of relay 182 closed by a biasing spring to complete a circuit through a second signal means 184. The signal means 184 may be in the form of an electrically energizable lamp providing a visual signal, or a buzzer, bell or the like giving an audible signal, the contacts of the relay and the signal means 184 being in circuit with a power supply L1, L2.

In this manner, audible or visual signals are provided to indicate to an operator any abnormal increase or decrease in the level of glass in the feeder 30 so that proper corrections may be had of the control circuits for the feeder and melter.

Another form of the invention is illustrated in FIGURES 7 and 8. In this arrangement the bodies or pieces of mineral material to be reduced to a molten condition in a melter are delivered into a melter of increased length as compared with the length of the feeder and the molten material in the melter is delivered into the feeder in the form of a thin film or films moving along a surface or surfaces into the feeder for purposes hereinafter explained.

The construction shown in FIGURES 7 and 8 is supported by a structural frame arrangement of the character illustrated in FIGURES 1 through 3. The hopper 200, containing a supply of pieces or bodies of mineral material 24' such as glass cullet is provided with a delivery region 202 substantially equal to the length of the melter.

The feeder or feeder chamber 206 is supported and embraced by longitudinally extending blocks 208 arranged at the sides of the feeder compartment or feeder chamber 206. The bottom wall 210 of the feeder is formed with a plurality or rows of orificed tips or projections 212 through which the heat-softened or molten glass or other mineral material in the feeder chamber 206 is discharged to provide a plurality of streams from which filaments or fibers are formed by attenuation. Longitudinally extending blocks 214 are mounted on the blocks 208 and serve to embrace and support a melter or melting chamber 216. The blocks 208 and 214 are formed of high temperature refractory and are of substantial thickness to minimize heat loss.

The feeder chamber 206 is of generally rectangular cross-section formed with longitudinally extending side walls 218 joined with the bottom wall 210, the upper terminus of the side walls 218 extending laterally providing flanges 220 which are engaged and supported by the blocks 208. The upper end regions of the end walls 222 of the feeder are provided with lengthwise flanged portions 224 as shown in FIGURE 7 for a purpose hereinafter explained. A screen 226 preferably of V-shaped configuration is disposed within the feeder and extends lengthwise thereof, the screen preventing or restricting passage of particles or cords of incompletely melted glass.

The melter or melting compartment 216 is formed with side wall portions 228 which are arranged in converging relation as shown in FIGURE 8, the upper end regions of the side walls 228 extending laterally providing flanges 230 in engagement with the upper surfaces of the refractory blocks 214.

The end walls 232 of the melting compartment 216 are substantially vertical and at their upper regions extend laterally forming flanges 234.

As will be seen in FIGURES 7 and 8, the side and end walls of the hopper section 200 terminate adjacent but slightly spaced from the entrance of the melter section 216. Through this arrangement the use of a separate guiding means or member for directing the pieces of glass 24' into the melter is avoided.

The walls 228 of the melter 216 are arranged in converging relation and are respectively joined with substantially vertical, spaced walls 246 forming a restricted walled passage 248 or region of restricted cross-sectional area. The vertical walls 246 are joined with outwardly and downwardly flared portions 349 which join with horizontal laterally extending flange portions 250, the latter having their edge regions extending downwardly and laterally forming flanges 252 which mate with flanges on the screen 226 and flanges 220 at the upper ends of the side walls of the feeder.

The restricted region or passage 248 provides a delivery outlet through which the molten glass flows from the melter 216. Means is provided to guide or conduct the molten material from the restricted region or passage 248 into the feeder 206 in a manner whereby the molten material flows in the form of one or more comparatively thin films throughout the length of the melter. Depending from the juncture of the flared portions 249 and horizontal flanges 250 associated with the melter is a pair of substantially vertically arranged planar plates or ramps 256, the lower edge regions of the plates or ramps 256 preferably coinciding with or slightly below the level of molten material normally maintained in the feeder 206. The ends of the plates 256 are welded or otherwise joined to depending members 257 of the melter construction. Spaced lengthwise of the passage 248 is a plurality of transversely extending plate-like members or baffles 260 which subdivide the passage 248 into compartments and serve to reinforce the walls 246 defining the passage 248 as well as to provide further restriction of the passage.

The feeder 206, the melter 216 and associated wall surfaces, and the plates 257, 256 and 260 are fashioned of platinum rhodium or other metal capable of withstanding the high temperatures of the molten glass or other molten mineral material. In the embodiment illustrated the plates 256 are of planar shape and provide flat surfaces or ramps along which the molten material from the passage 248 flows in two thin films into the feeder.

The material flowing through the compartments of the passage 248 provided by the transverse members 260 flows along the downwardly and outwardly flaring surfaces of portions 248 and downwardly along the inner opposed surfaces of the plates 256 as the material at the exit of the passage 248 separates into transversely spaced thin films 259 as shown in FIGURE 8. The baffles 260 tend to assist in the formation of the films as they increase restriction to the flow of molten glass through the passage 248. The ingress of the film or films of glass into the glass in the feeder do not cause thermal shock in the feeder. Furthermore, the glass of thin film or films conducted or conveyed along the inner surfaces or ramps provided by the plates 256 is accommodated in the feeder without turbulence and without causing foaming of the glass as the plates 256 are unheated. By terminating the plates 256 adjacent or slightly below the normal level of molten glass in the feeder, there is a continuity and smooth flow of the films of glass into the feeder without causing ripples on the surface of the glass.

The softening or reduction of the marbles or pieces 24' of cullet or other mineral material to a flowable or molten condition is effected in the melting chamber 216 by heat generated through the flow of electric current through the side and end walls of the chamber. The end walls 232 of the melting chamber are provided with connector terminals 264 which respectively accommodate terminal clamps 266 of current conductors which receive electric current from a supply.

The end walls 222 of the feeder 206 are provided with terminals 272 to which are secured terminal lugs 274 connected by current conductors with a current supply. Heat is applied to the feeder by flowing electric current through the feeder walls by a circuit means substantially independent of the circuit to the melter. The circuits shown in FIG. 6 may be utilized with the form of the invention shown in FIGURES 7 and 8.

A probe means similar to the probe means illustrated in the circuit diagram in FIGURE 6 may be utilized as a circuit controlling means for regulating the rate of melting of marbles or pieces 24' in the melting chamber in order to regulate or vary the rate of flow or delivery of molten glass or material into the feeder so that a substantially constant head of the molten material is maintained in the feeder. The probe means indicated at 280 consists of three probes corresponding to the probes 148, 170 and 179 shown schematically in FIGURE 6 arranged to control the melting rate in the melter in the same manner as described in reference to the form of the invention shown in FIGURES 1 through 6. Each probe element is contained in a metal tube 281 formed of heat resistant metal, one of the tubes being shown in FIGURE 8. The probes are sealed in the tubes so that the feeder chamber is normally unvented. As the films of molten glass are delivered into the feeder along and in contact with the surfaces of the members 256 without disturbance of the material in the feeder, the probe arrangement 280 may be disposed at the central region lengthwise of the feeder or at any other desired position.

In order to slightly increase the viscosity of the streams S delivered from the orificed tips 212 and enhance attenuation, a heat absorbing arrangement of the character shown in FIGURES 4 and 5 may be utilized with the form of the invention shown in FIGURES 7 and 8. A tubular manifold 284 mounted upon a support 285 disposed in parallelism with the bottom wall of the feeder is provided with transversely extending thin metal fins 286, a fin extending between each two rows of transversely arranged orificed projections 212. The ends of the manifold are respectively connected within outlet pipes to accommodate a circulating cooling fluid such as water.

The flanges 224 at the ends of the feeder, in coperation with the lengthwise extensions of metal members 250, provide an increased path for current between the feeder and melter and hence added resistance to reduce interflow of electric current between these components.

Through the method and arrangement of delivering molten glass or other material from the restricted region or passage 248 into the feeder in the form of a thin film or films the tendency for thermo-channeling of the glass or molten material is substantially eliminated. By flowing the glass in comparatively thin transversely spaced films extending a substantial length of the feeder, a more uniform temperature distribution is provided in the feeder.

The method of flowing the glass in one or more thin films eliminates the dynamic potential ensuing from the impact of a stream of substantial width and length in cross-section falling into a limited area in a feeder. A much slower flow of glass is obtained by distributing the glass in a thin film over a much greater area and hence less foaming of the glass due to the elimination of turbulence at the region of entrance of the molten glass into the body of glass in the feeder and because the plates 256, terminating at the depending members 257, are not disposed in a direct electrical path and are therefore substantially unheated.

It is apparent that, within the scope of the invention, modifications and different arrangements may be made other than as herein disclosed, and the present disclosure is illustrative merely, the invention comprehending all variations thereof.

I claim:

1. The method of processing heat-softenable mineral material including establishing a supply of bodies of material, feeding the bodies to a melting zone by melting advancing bodies in said zone, applying heat to the bodies in the melting zone to reduce the bodies to a molten condition, flowing the molten material into a restricted passage, flowing a thin film of the material in contact with an unheated surface from the passage into the material in a feeder zone, applying heat to the material in the feeder zone to maintain the material in a flowable condition, and flowing streams of the molten material from the feeder zone.

2. The method of processing heat-softenable mineral material including establishing a supply of bodies of material, feeding the bodies of the supply to a melting zone by melting advancing bodies in said zone, applying heat to the bodies in the melting zone to reduce the bodies to a molten condition, flowing the molten material into a restricted passage, flowing the material from the passage along unheated surfaces in a plurality of films into the material in a feeder zone, applying heat to the material in the feeder zone to maintain the material in a flowable condition, and flowing streams of the molten material from the feeder zone.

3. The method of processing heat-softenable mineral material including establishing a supply of bodies of the mineral material, delivering the bodies to a melting zone by melting advancing bodies in said zone, applying electric current to the material in the melting zone to soften the material to a flowable condition, flowing the material into a restricted passage, flowing the material in thin films from the passage along spaced unheated surfaces into the material in a feeder zone, applying electric current to a material in the feeder zone to maintain the material in flowable condition, flowing streams of the material from the feeder zone, and varying the electric current applied to the melting zone in accordance with variations in the amount of material in the feeder zone to regulate the rate of melting of the bodies of material in the melting zone.

4. Apparatus for melting and conditioning heat-softenable mineral material including, in combination, a feeder chamber, a melting chamber disposed above the feeder chamber, said melting chamber being adapted to receive bodies of mineral material from a supply, said melting chamber being formed with a walled passage of restricted cross-sectional area arranged above the feeder chamber through which heat-softened material flows from the melting chamber, an unheated member depending into the feeder chamber having its lower portion adjacent the level of the material in the feeder chamber whereby a film of the material from the walled passage is conducted by the member into the feeder chamber, a wall of the feeder chamber being formed with a plurality of orifices through which the material flows from the feeder in a plurality of streams, and means for applying heat individually to the chambers.

5. Apparatus for melting and conditioning heat-softenable mineral material including, in combination, a feeder chamber, a melting chamber disposed above the feeder chamber, said melting chamber being adapted to support a bulk supply of bodies of mineral material and receive bodies of mineral material from the supply, said melting chamber being formed with a walled passage of restricted cross-sectional area arranged above the feeder chamber thronugh which heat-softened material flows from the melting chamber, a pair of spaced plates depending from the melting chamber into the feeder chamber and disposed lengthwise thereof having their extremities terminating adjacent the level of the material in the feeder chamber, said plates providing surfaces along which the material from the passage flows into the feeder chamber, a wall of the feeder chamber being formed with a plurality of orifices through which the material flows from the feeder in a plurality of streams, a first circuit for supplying electric current to the melting chamber to provide heat for softening the pieces of material, a second circuit for supplying electric current to the feeder chamber, and means responsive to variations in the amount of material in the feeder chamber for varying the current flow to the melting chamber to control the rate of softening of pieces of material in the melting chamber.

6. Apparatus for melting and conditioning heat-softenable mineral material including, in combination, a feeder chamber, a melting chamber disposed above the feeder chamber, said melting chamber being adapted to support a bulk of supply bodies of mineral material and receive bodies of mineral material from the supply, said melting chamber being formed with a walled passage of restricted cross-sectional area arranged above the feeder chamber through which heat-softened material flows from the melting chamber, a pair of spaced plates depending from the melting chamber into the feeder chamber and extending lengthwise thereof having their lower extremities terminating adjacent the level of the material in the feeder chamber, the ends of said plates being spaced from the ends of the feeder chamber, said plates providing surfaces along which the material from the passage flows into the feeder chamber, a wall of the feeder chamber being formed with a plurality of orifices through which the material flows from the feeder in a plurality of streams, a first circuit for supplying electric current to the melting chamber to provide heat for softening the pieces of material, a second circuit for supplying electric current to the feeder chamber, and means for varying the current flow to the melting chamber to control the rate of softening of pieces of material in the melting chamber.

7. Apparatus of the character disclosed, in combination, a melting chamber arranged to receive pieces of heat-softenable mineral material, means disposed adjacent the melting chamber containing a bulk supply of pieces of the material whereby the supply is supported by material in the melting chamber, means for applying heat to the pieces of material in the melting chamber to reduce the material to a molten condition, a feeder chamber disposed beneath the melting chamber, said melting chamber being formed with a walled restricted passage through which molten material flows from the feeder, a plurality of longitudinally spaced baffles in said restricted passage, orifice means in a bottom wall of the feeder through which the molten material is discharged in a plurality of streams, a circuit for supplying electric current to the melting chamber providing heat for melting the pieces of material, and probe means associated with said circuit and extending into the feeder chamber responsive to variations in the amount of material in the feeder chamber for varying the current flow to the melting chamber to control the rate of melting of the pieces of material to maintain a level of molten material in the feeder chamber substantially below the restricted passage.

8. Apparatus of the character disclosed, in combination, a melting chamber arranged to receive pieces of heat-softenable mineral material, means disposed adjacent the melting chamber containing a bulk supply of pieces of the material whereby the supply is supported by material in the melting chamber, means for applying heat to the pieces of material in the melting chamber to reduce the material to a molten condition, a feeder chamber disposed beneath the melting chamber, said melting chamber being formed with a walled restricted passage through which molten material flows from the feeder, orifice means in a bottom wall of the feeder through which the molten material is discharged in a plurality of streams, a pair of spaced unheated plates extending from the region of the restricted passage into the feeder chamber to a zone approximately at the level of material in the feeder chamber, said plates providing means for guiding the molten material from the passage in the form of continuous thin films into the feeder chamber, a circuit for supplying electric current to the melting chamber providing heat for melting the pieces of material, and probe means associated with said circuit and extending into the feeder chamber responsive to variations in the amount of material in the feeder chamber for varying the current flow to the melting chamber to control the rate of melting of the pieces of material to maintain a level of molten material in the feeder chamber substantially below the restricted passage.

9. Apparatus of the character disclosed, in combination, a melting chamber arranged to receive pieces of heat-softenable mineral material, means disposed adjacent the melting chamber containing a bulk supply of pieces of the material whereby the supply is supported by material in the melting chamber, means for applying heat to the pieces of material in the melting chamber to reduce the material to a molten condition, a feeder chamber disposed beneath the melting chamber, said melting chamber being formed with a walled restricted passage through which molten material flows from the feeder, orifice means in a bottom wall of the feeder through which the molten material is discharged in a plurality of streams, a pair of spaced unheated plates extending from a region adjacent the restricted passage into the feeder chamber to a zone approximately at the level of material in the feeder chamber, said plates providing means for guiding the molten material from the passage in the form of continuous thin films into the feeder chamber, transversely disposed reinforcing members spaced lengthwise of the plates and joined to said plates, a circuit for supplying electric current to the melting chamber providing heat for melting the pieces of material, and means responsive to variations in the amount of material in the feeder chamber for varying the current flow to the melting chamber to control the rate of melting of the pieces of material to maintain a level of molten material in the feeder chamber substantially below the restricted passage.

References Cited in the file of this patent

UNITED STATES PATENTS

| | | |
|---|---|---|
| 2,465,283 | Schlehr | Mar. 22, 1949 |
| 2,485,851 | Stevens | Oct. 25, 1949 |
| 2,565,941 | Barnard | Aug. 28, 1951 |
| 2,687,599 | Fletcher | Aug. 31, 1954 |
| 2,780,890 | Russell | Feb. 12, 1957 |
| 2,794,058 | Russell | May 28, 1957 |

FOREIGN PATENTS

| | | |
|---|---|---|
| 1,008,738 | France | Feb. 27, 1952 |
| 78,183 | Netherlands | Jan. 15, 1955 |